United States Patent
Smith et al.

(10) Patent No.: US 9,882,185 B2
(45) Date of Patent: Jan. 30, 2018

(54) BATTERY CELL ASSEMBLY

(71) Applicant: LG Chem, Ltd., Seoul (KR)

(72) Inventors: Alexander Jeffrey Smith, White Lake, MI (US); Robert Merriman, Shelby Township, MI (US); Scott Dudley, Commerce Township, MI (US); Mohamed Alamgir, Rochester Hills, MI (US); Heekook Yang, Troy, MI (US); Michael P. Garascia, Waterford, MI (US)

(73) Assignee: LG Chem, Ltd., Seoul (KR)

( * ) Notice: Subject to any disclaimer, the term of this patent is extended or adjusted under 35 U.S.C. 154(b) by 222 days.

(21) Appl. No.: 14/920,750

(22) Filed: Oct. 22, 2015

(65) Prior Publication Data

US 2017/0117517 A1    Apr. 27, 2017

(51) Int. Cl.
*H01M 2/10* (2006.01)
*H01M 10/0525* (2010.01)

(52) U.S. Cl.
CPC ....... *H01M 2/1016* (2013.01); *H01M 2/1022* (2013.01); *H01M 2/1072* (2013.01); *H01M 10/0525* (2013.01)

(58) Field of Classification Search
CPC ............. H01M 2/1016; H01M 2/1022; H01M 2/1072; H01M 10/0525
See application file for complete search history.

(56) References Cited

U.S. PATENT DOCUMENTS

| | | |
|---|---|---|
| 8,173,293 B2 | 5/2012 | Kim |
| 2002/0160257 A1 | 10/2002 | Lee et al. |
| 2014/0272504 A1 | 9/2014 | Edington et al. |
| 2015/0263378 A1 | 9/2015 | Pasma et al. |

FOREIGN PATENT DOCUMENTS

| | | |
|---|---|---|
| EP | 0431810 A1 | 6/1991 |
| JP | S57119458 U | 7/1982 |
| KR | 1020070020597 A | 12/2009 |
| KR | 1020100137290 A | 12/2010 |
| KR | 1020100016708 | 6/2013 |
| KR | 101365718 B1 | 2/2014 |
| KR | 1020140035646 A | 9/2015 |

OTHER PUBLICATIONS

International Search Report for Application No. PCT/KR2016/011809 dated Feb. 13, 2017.
European Search Report for European Patent Application No. 16857785.6 dated Oct. 11, 2017.

*Primary Examiner* — Jane Rhee
(74) *Attorney, Agent, or Firm* — Buckert Patent & Trademark Law Firm PC; John F. Buckert (57) ABSTRACT

A battery cell assembly having first, second, and third battery cells and a unitary wrapping sheet is provided. The unitary wrapping sheet is disposed on a top surface and a bottom surface of the first battery cell. The unitary wrapping sheet is further disposed on a top surface and a bottom surface of the second battery cell. The unitary wrapping sheet is further disposed on a top surface and a bottom surface of the third battery cell. The unitary wrapping sheet is further disposed on and encloses a portion of a combined periphery of the first, second, and third battery cells such that the top surface of the first battery cell, the top surface of the second battery cell, and the top surface of the third battery cell are held substantially parallel to one another.

14 Claims, 11 Drawing Sheets

BATTERY CELL ASSEMBLY

BACKGROUND

The inventors herein have recognized a need for a battery cell assembly having an improved structure for coupling battery cells together.

SUMMARY

A battery cell assembly in accordance with an exemplary embodiment is provided. The battery cell assembly includes a first battery cell having a top surface and a bottom surface. The battery cell assembly further includes a second battery cell having a top surface and a bottom surface. The battery cell assembly further includes a third battery cell having a top surface and a bottom surface. The battery cell assembly further includes a unitary wrapping sheet that is disposed on the first battery cell and directly contacts the top surface and the bottom surface of the first battery cell. The unitary wrapping sheet is further disposed on the second battery cell such that the unitary wrapping sheet directly contacts the top surface and the bottom surface of the second battery cell. The unitary wrapping sheet is further disposed on the third battery cell such that the unitary wrapping sheet directly contacts the top surface and the bottom surface of the third battery cell. The unitary wrapping sheet is further disposed on and encloses a portion of a combined periphery of the first, second, and third battery cells such that the top surface of the first battery cell, the top surface of the second battery cell, and the top surface of the third battery cell are held substantially parallel to one another.

DETAILED DESCRIPTION

Referring to FIGS. 1-6, a battery cell assembly 10 in accordance with an exemplary embodiment is provided. The battery cell assembly 10 includes battery cells 20, 22, 24, and a unitary wrapping sheet 30. An advantage of the battery cell assembly 10 is that the assembly 10 utilizes the unitary wrapping sheet 30 to hold the battery cells 20, 22, 24 in a substantially parallel orientation with respect one another without having to utilize intermediate frame members coupled to the battery cells. As a result, the battery cell assembly 10 is lighter in weight and can be more easily assembled as compared to other battery cell assemblies.

Figure 1:
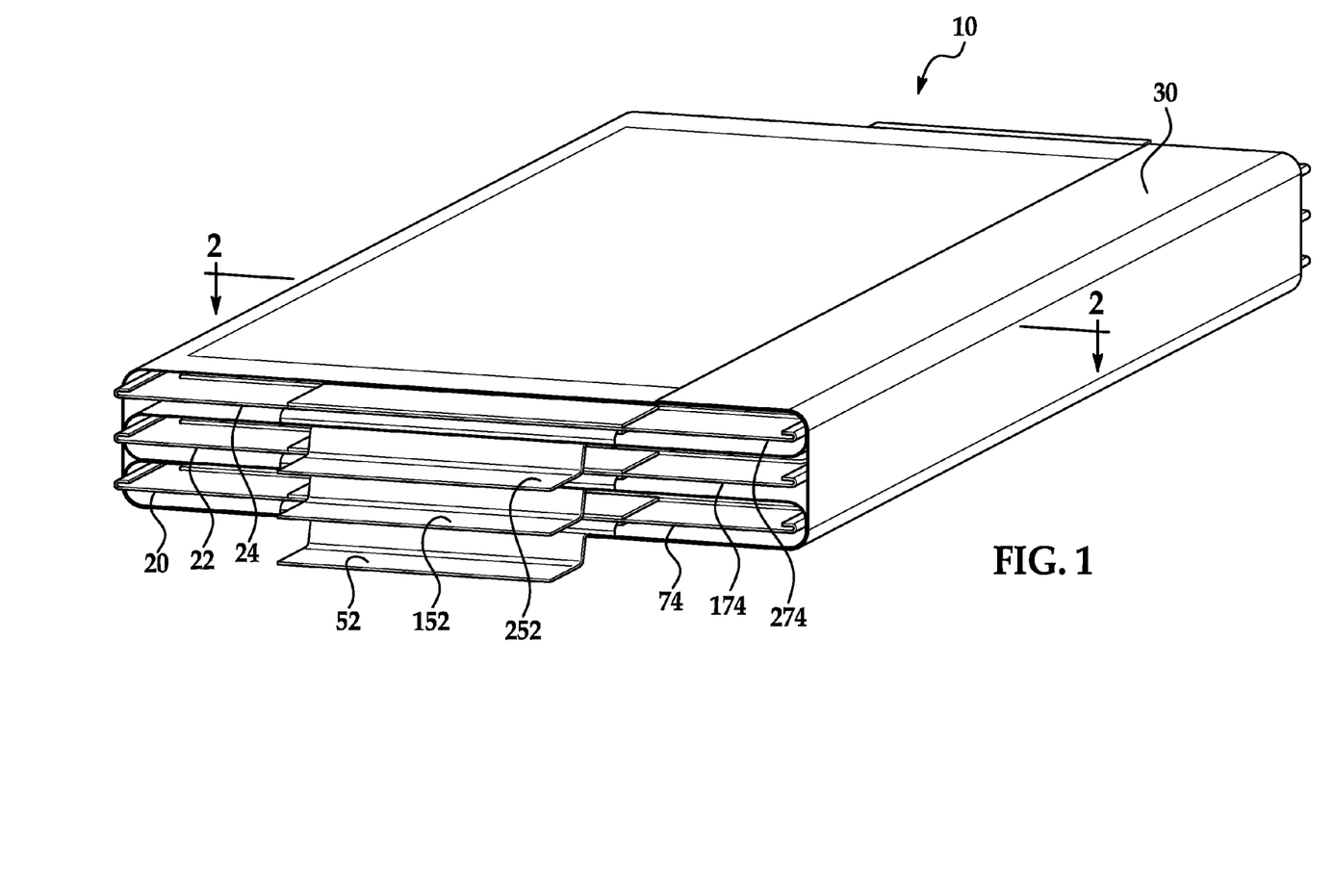
FIG. 1 is a schematic of a battery cell assembly in accordance with an exemplary embodiment.
Figure 2:
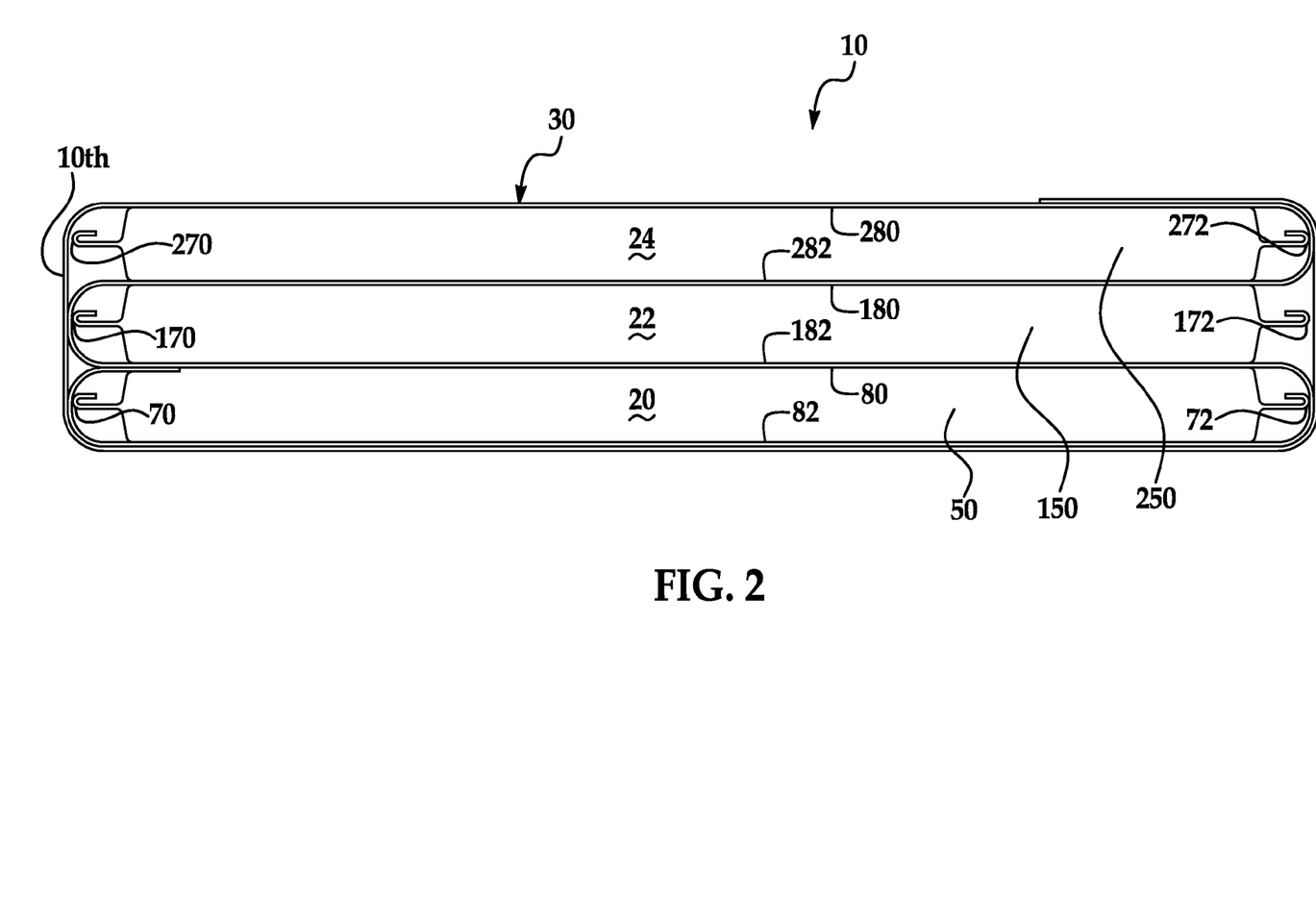
FIG. 2 is a cross-sectional schematic of the battery cell assembly of FIG. 1 taken along lines 2-2 in FIG. 1.

The battery cell 20 has a rectangular-shaped external housing 50, a first electrical terminal 52, and a second electrical terminal (not shown). The rectangular-shaped external housing 50 has a first end 70, a second end 72, a third end 74, and a fourth end (not shown). The first and second ends 70, 72 extend substantially parallel to one another. Further, the third end 74 and the fourth end extend substantially parallel to one another, and perpendicular to the first and second ends 70, 72. The rectangular-shaped external housing 50 further includes a top surface 80 and a bottom surface 82. The first electrical terminal 52 and the second electrical terminal of the battery cell 20 extend outwardly from the third end 74 and the fourth end, respectively, of the rectangular-shaped external housing 50. In an exemplary embodiment, the battery cell 20 is a lithium-ion pouch-type battery cell. Further, in an exemplary embodiment, the rectangular-shaped external housing 50 is a pouch-type rectangular-shaped external housing constructed of a sheet, which sheet is formed by laminating a polymer film on a metal sheet made of aluminum for example.

The battery cell 22 has a rectangular-shaped external housing 150, a first electrical terminal 152, and a second electrical terminal (not shown). The rectangular-shaped external housing 150 has a first end 170, a second end 172, a third end 174, and a fourth end (not shown). The first and second ends 170, 172 extend substantially parallel to one another. Further, the third end 174 and the fourth end extend substantially parallel to one another, and perpendicular to the first and second ends 170, 172. The rectangular-shaped external housing 150 further includes a top surface 180 and a bottom surface 182. The first electrical terminal 152 and the second electrical terminal of the battery cell 22 extend outwardly from the third end 174 and the fourth end, respectively, of the rectangular-shaped external housing 150. In an exemplary embodiment, the battery cell 22 is a lithium-ion pouch-type battery cell. Further, in an exemplary embodiment, the rectangular-shaped external housing 150 is a pouch-type rectangular-shaped external housing constructed of a sheet, which sheet is formed by laminating a polymer film on a metal sheet made of aluminum for example.

The battery cell 24 has a rectangular-shaped external housing 250, a first electrical terminal 252, and a second electrical terminal (not shown). The rectangular-shaped external housing 250 has a first end 270, a second end 272, a third end 274, and a fourth end (not shown). The first and second ends 270, 272 extend substantially parallel to one another. Further, the third end 274 and the fourth end extend substantially parallel to one another, and perpendicular to the first and second ends 270, 272. The rectangular-shaped external housing 250 further includes a top surface 280 and a bottom surface 282. The first electrical terminal 252 and the second electrical terminal of the battery cell 24 extend outwardly from the third end 274 and the fourth end, respectively, of the rectangular-shaped external housing 250. In an exemplary embodiment, the battery cell 24 is a lithium-ion pouch-type battery cell. Further, in an exemplary embodiment, the rectangular-shaped external housing 250 is a pouch-type rectangular-shaped external housing constructed of a sheet, which sheet is formed by laminating a polymer film on a metal sheet made of aluminum for example.

The unitary wrapping sheet 30 is a flexible sheet that is disposed over the battery cells 20, 22, 24 to hold the battery cells 20, 22, 24 in a fixed position relative to one another. For example, the top surfaces 80, 180, 182 of the battery cells 20, 22, 24, respectively, are held substantially parallel to one another utilizing the unitary wrapping sheet 30. Further, the first ends 70, 170, 270 of the battery cells 20, 22, 24, respectively, are held substantially co-planar with one another utilizing the unitary wrapping sheet 30. Further, the second ends 72, 172, 272 of the battery cells 20, 22, 24, respectively, are held substantially co-planar with one another utilizing the unitary wrapping sheet 30. The unitary wrapping sheet 30 communicates with air, and does not contact an electrolyte. In an exemplary embodiment, the unitary wrapping sheet 30 is a polymeric sheet comprising at least one of a polymeric film, a polymeric mesh, and a polymeric fabric. In an alternative embodiment, the unitary wrapping sheet 30 is a natural fiber sheet comprising at least one of a natural fiber film, a natural fiber mesh, and a natural fiber fabric. In another alternative embodiment, the unitary wrapping sheet 30 is at least one of a woven carbon fiber sheet and a polyester fiber sheet. In still another alternative embodiment, the unitary wrapping sheet 30 is a flexible metallic sheet.

The unitary wrapping sheet 30 is disposed on the rectangular-shaped external housing 50 of the battery cell 20 and directly contacts the top surface 80 and the bottom surface 82 of the first battery cell 20. Further, the unitary wrapping sheet 30 is disposed on the rectangular-shaped external housing 150 of the battery cell 22 such that the unitary wrapping sheet 30 directly contacts the top surface 180 and the bottom surface 182 of the battery cell 22. Also, the unitary wrapping sheet 30 is disposed on the battery cell 24 such that the unitary wrapping sheet 30 directly contacts the top surface 280 and the bottom surface 282 of the battery cell 24. Still further, the unitary wrapping sheet 30 is disposed on and encloses a portion of a combined periphery of the battery cells 20, 22, 24 such that the top surface 80 of the battery cell 20, the top surface 180 of the battery cell 22, and the top surface 280 of the battery cell 24 are held substantially parallel to one another. In an exemplary embodiment, the unitary wrapping sheet 30 is a substantially rectangular-shaped sheet.

Figure 3:
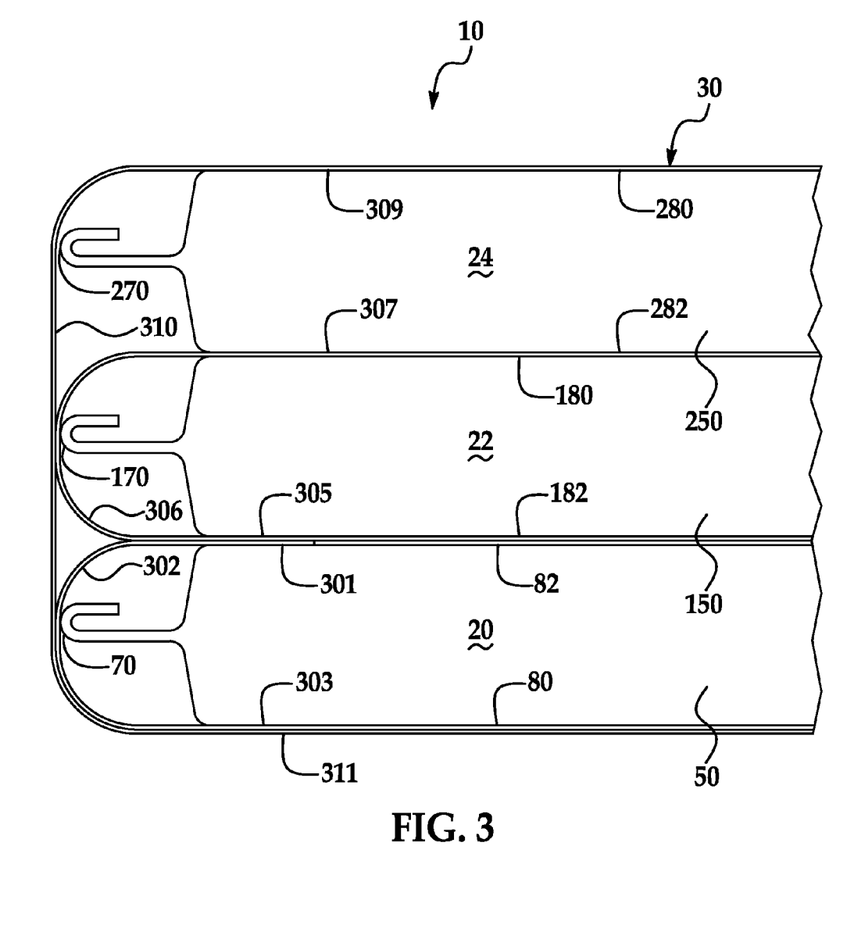
FIG. 3 is an enlarged schematic of a sheet portion of the battery cell assembly of FIG. 2.
Figure 4:
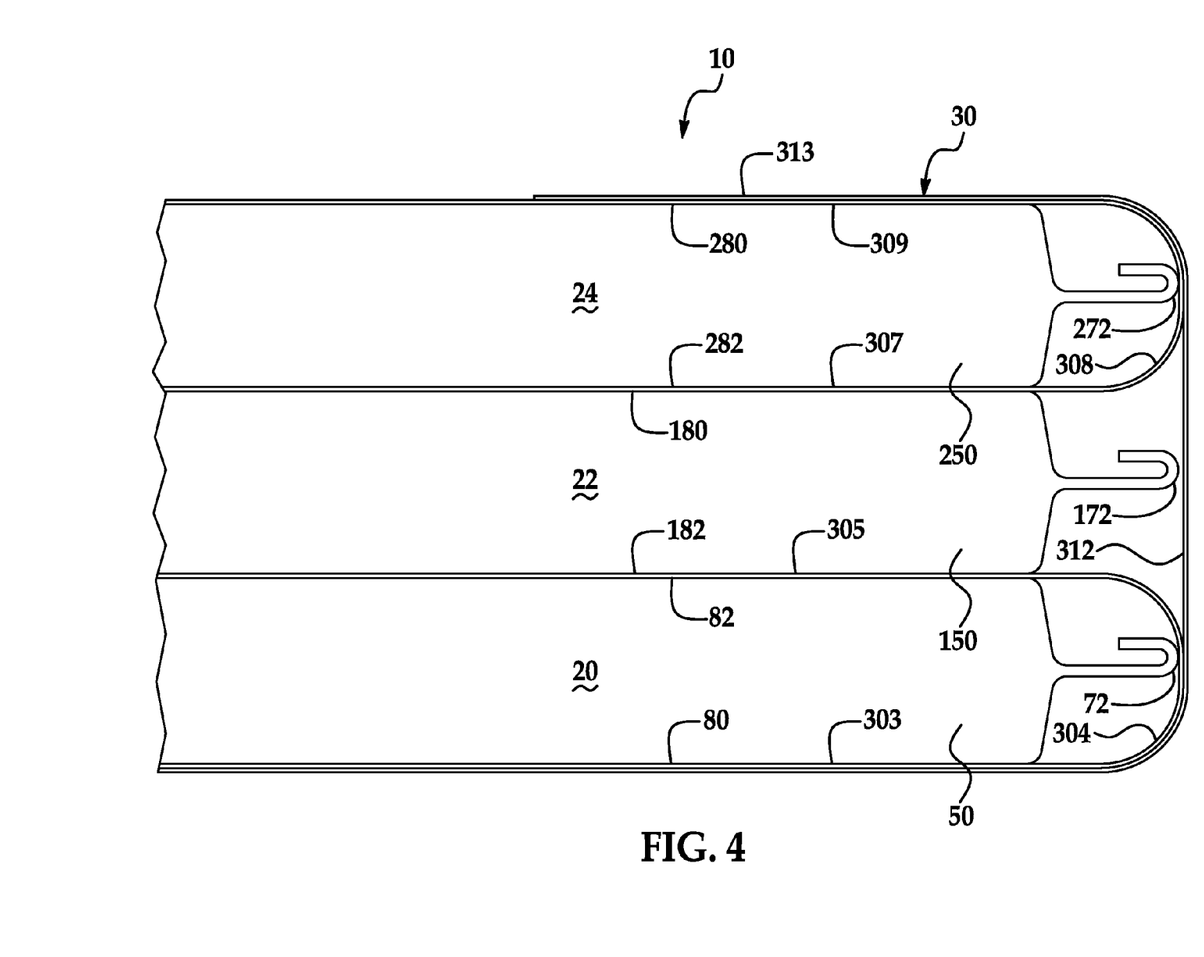
FIG. 4 is an enlarged schematic of another sheet portion of the battery cell assembly of FIG. 2.
Figure 5:
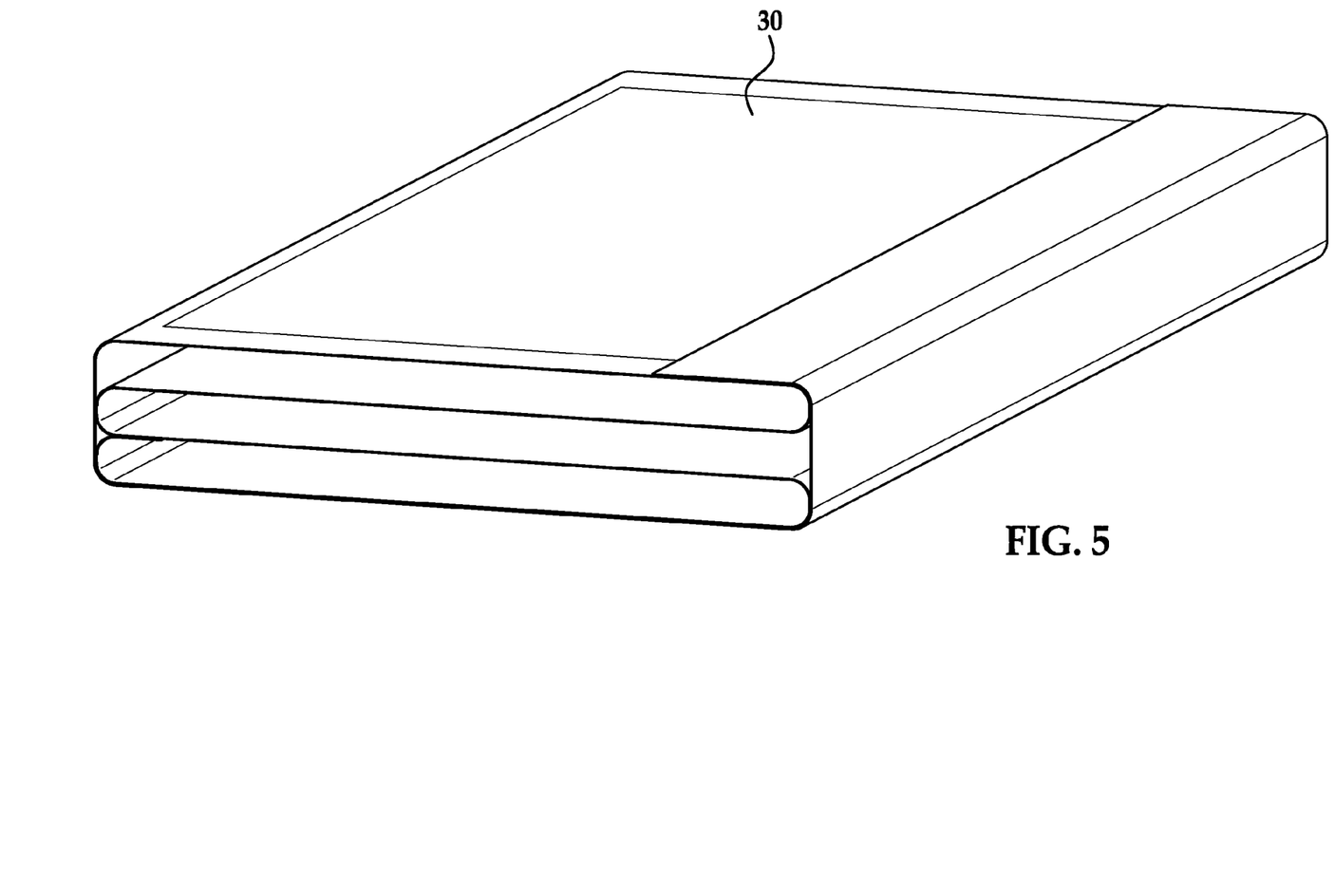
FIG. 5 is a schematic of a unitary wrapping sheet utilized in the battery cell assembly of FIG. 1 shown in an installed position without first, second, and third battery cells being shown.
Figure 6:
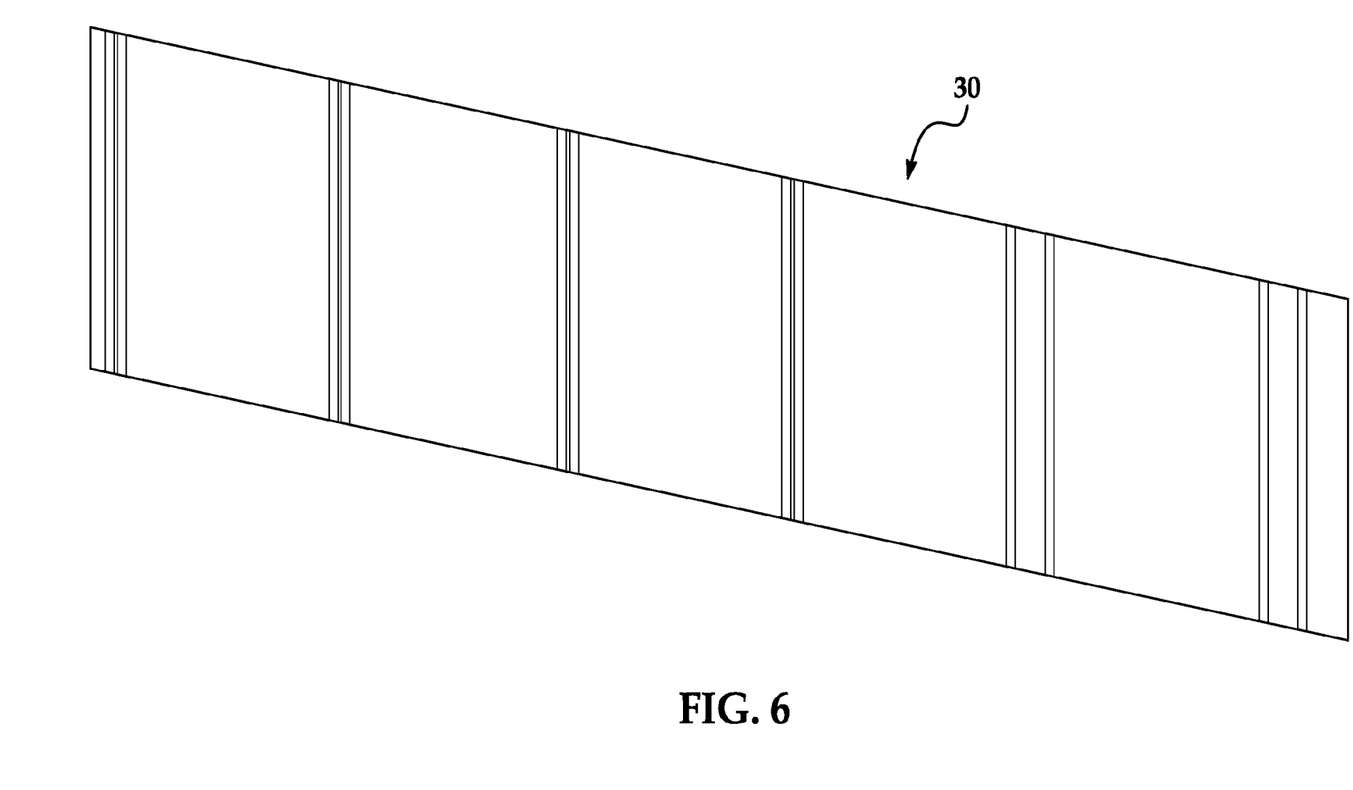
FIG. 6 is another schematic of the unitary wrapping sheet of FIG. 5 before being wrapped around first, second, and third battery cells.

Referring to FIGS. 3 and 4, the unitary wrapping sheet 30 includes a first sheet portion 301, a second sheet portion 302, a third sheet portion 303, a fourth sheet portion 304, a fifth sheet portion 305, a sixth sheet portion 306, a seventh sheet portion 307, an eighth sheet portion 308, a ninth sheet portion 309, a tenth sheet portion 310, an eleventh sheet portion 311, a twelfth sheet portion 312, and a thirteenth sheet portion 313. The second sheet portion 302 is coupled to and disposed between the first sheet portion 301 and the third sheet portion 303. The fourth sheet portion 304 is coupled to and disposed between the third sheet portion 303 and the fifth sheet portion 305. The sixth sheet portion 306 is coupled to and disposed between the fifth sheet portion 305 and the seventh sheet portion 307. The eighth sheet portion 308 is coupled to and disposed between the seventh sheet portion 307 and the ninth sheet portion 309. The tenth sheet portion 310 is coupled to and disposed between the ninth sheet portion 309 and the eleventh sheet portion 311. The twelfth sheet portion 312 is coupled to and disposed between the eleventh sheet portion 311 and the thirteenth sheet portion 313.

The placement of the unitary wrapping sheet 30 on the battery cells 20, 22, 24 will now be described.

The first sheet portion 301 is disposed on and directly contacts the top surface 80 of the battery cell 20.

The second sheet portion 302 extends from the first sheet portion 301. The second sheet portion 302 is disposed proximate to and encloses the first end 70 of the battery cell 20.

The third sheet portion 303 extends from the second sheet portion 302. The third sheet portion 303 is disposed on and directly contacts the bottom surface 82 of the battery cell 20.

The fourth sheet portion 304 extends from the third sheet portion 303. The fourth sheet portion 304 is disposed proximate to and encloses the second end 72 of the battery cell 20.

The fifth sheet portion 305 extends from the fourth sheet portion 304. The fifth sheet portion 305 is disposed on and directly contacts both the top surface 80 of the battery cell 20 and the bottom surface 182 of the battery cell 22.

The sixth sheet portion 306 extends from the fifth sheet portion 305. The sixth sheet portion 306 is disposed proximate to and encloses the first end 170 of the battery cell 22.

The seventh sheet portion 307 extends from the sixth sheet portion 306. The seventh sheet portion 307 is disposed on and directly contacts both the top surface 180 of the battery cell 22 and the bottom surface 282 of the battery cell 24.

The eighth sheet portion 308 extends from the seventh sheet portion 307. The eighth sheet portion 308 is disposed proximate to and encloses the second end 272 of the battery cell 24.

The ninth sheet portion 309 extends from the eighth sheet portion 308. The ninth sheet portion 309 is disposed on and directly contacts the top surface 280 of the battery cell 24.

The tenth sheet portion 310 extends from the ninth sheet portion 309. The tenth sheet portion 310 is disposed proximate to and encloses the first end 270 of the battery cell 24. The tenth sheet portion 310 is further disposed against the sixth sheet portion 306 and the second sheet portion 302.

The eleventh sheet portion 311 extends from the tenth sheet portion 310. The eleventh sheet portion 311 is disposed on and directly contacts the third sheet portion 303 such that the third sheet portion 303 is disposed between the eleventh sheet portion 311 and the bottom surface 82 of the battery cell 20.

The twelfth sheet portion 312 extends from the eleventh sheet portion 311. The twelfth sheet portion 312 is disposed against the fourth sheet portion 304. The twelfth sheet portion 312 is further disposed proximate to and encloses the second end 172 of the battery cell 22. The twelfth sheet portion 312 is further disposed against the eighth sheet portion 308.

The thirteenth sheet portion 313 extends from the twelfth sheet portion 312. The thirteenth sheet portion 313 is disposed on and directly contacts the ninth sheet portion 309 such that the ninth sheet portion 309 is disposed between the thirteenth sheet portion 313 and the top surface 280 of the battery cell 24. The thirteenth sheet portion 313 is adhered to the ninth sheet portion 309 utilizing at least one of an ultrasonic weld joint, an adhesive, or another attachment device.

Referring to FIGS. 7-11, a battery cell assembly 410 in accordance with an exemplary embodiment is provided. The battery cell assembly 410 includes battery cells 420, 422, 424, and a unitary wrapping sheet 430. An advantage of the battery cell assembly 410 is that the assembly 410 utilizes the unitary wrapping sheet 430 to hold the battery cells 420,

422, 424 in a substantially parallel orientation with respect one another without having to utilize intermediate frame members coupled to the battery cells. As result, the battery cell simply 410 is lighter in weight and can be more easily assembled as compared to other battery cell assemblies.

Figure 7:
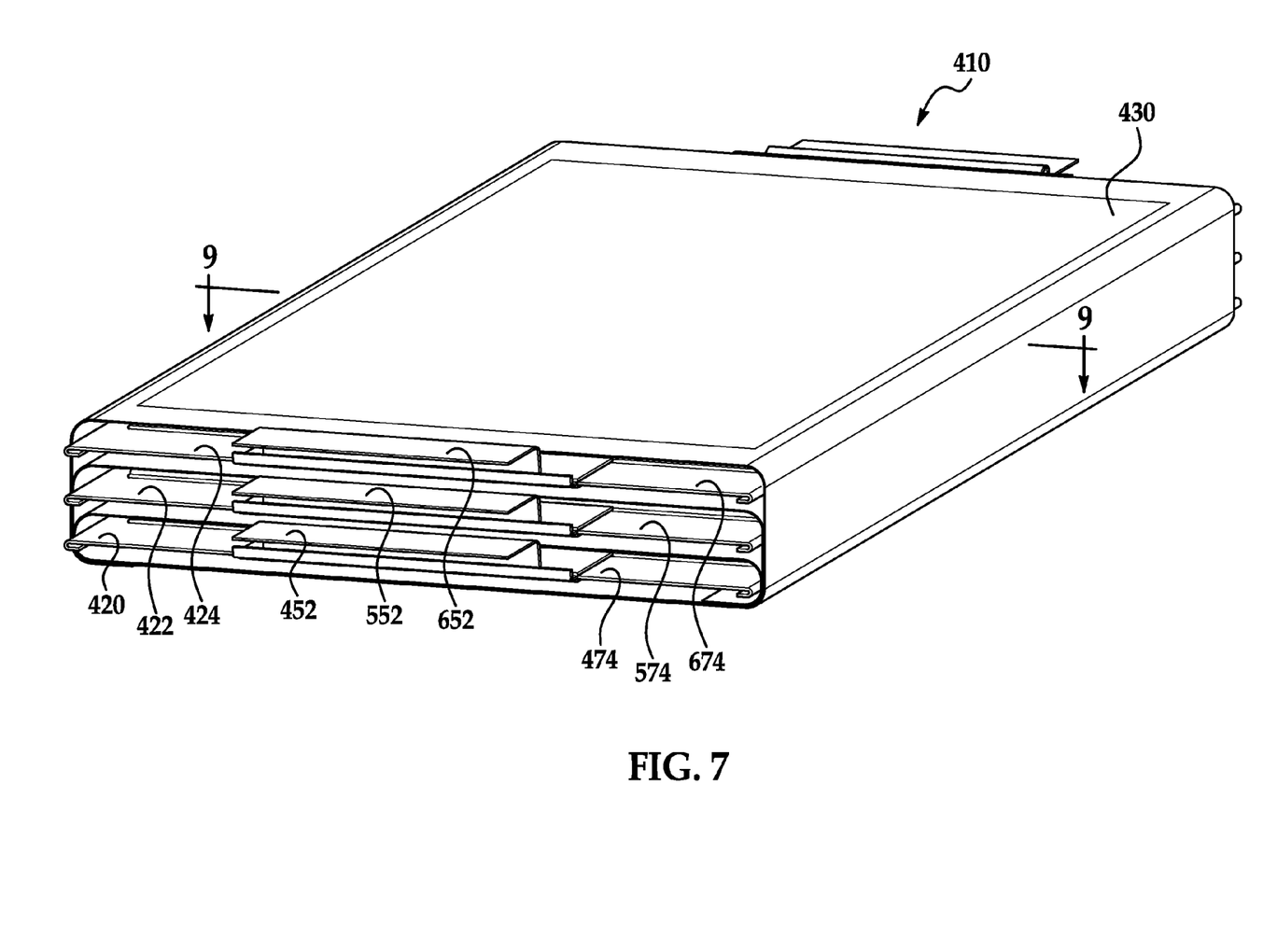
FIG. 7 is a schematic of a battery cell assembly in accordance with another exemplary embodiment.
Figure 8:
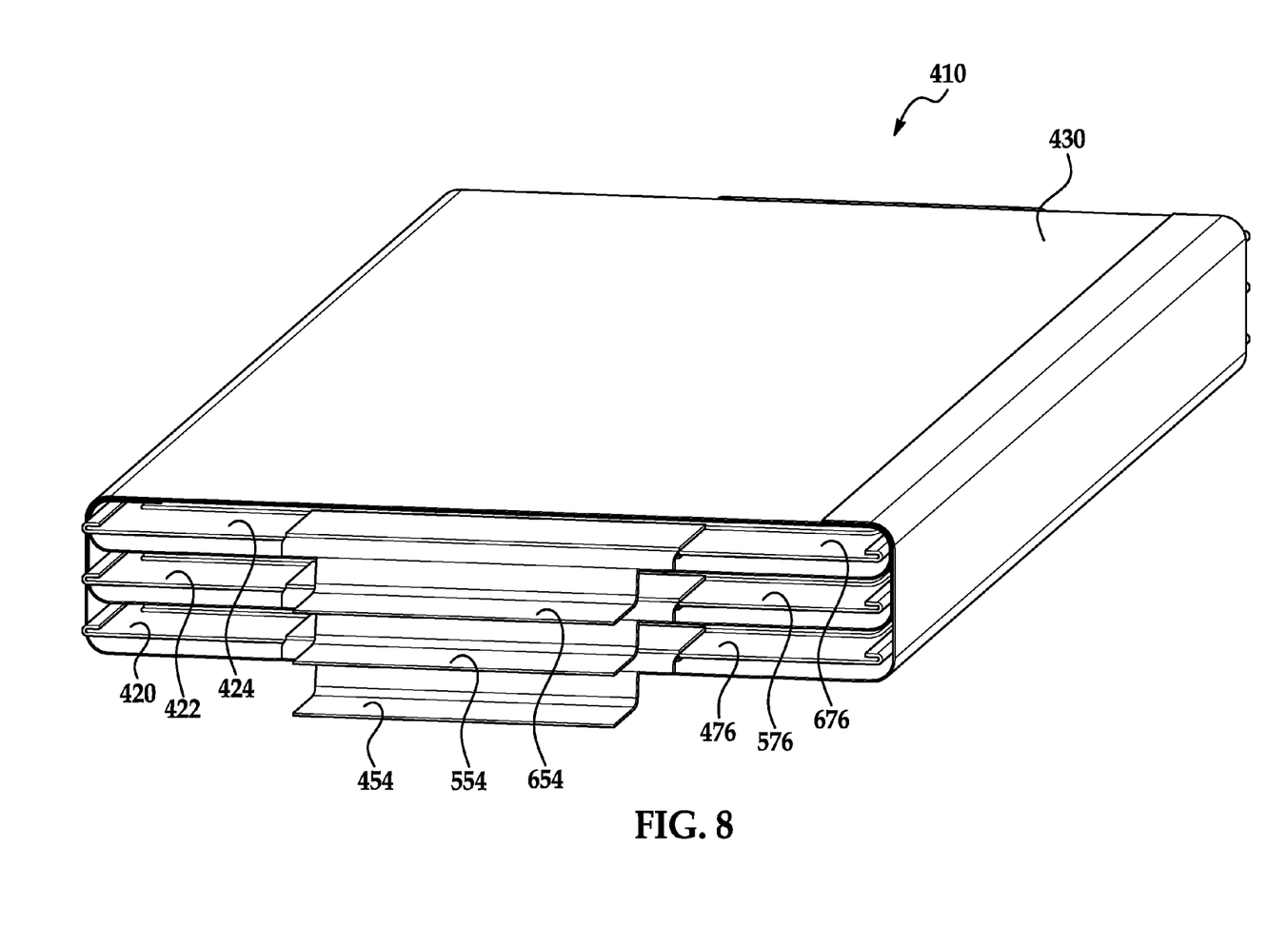
FIG. 8 is another schematic of the battery cell assembly of FIG. 7.
Figure 9:
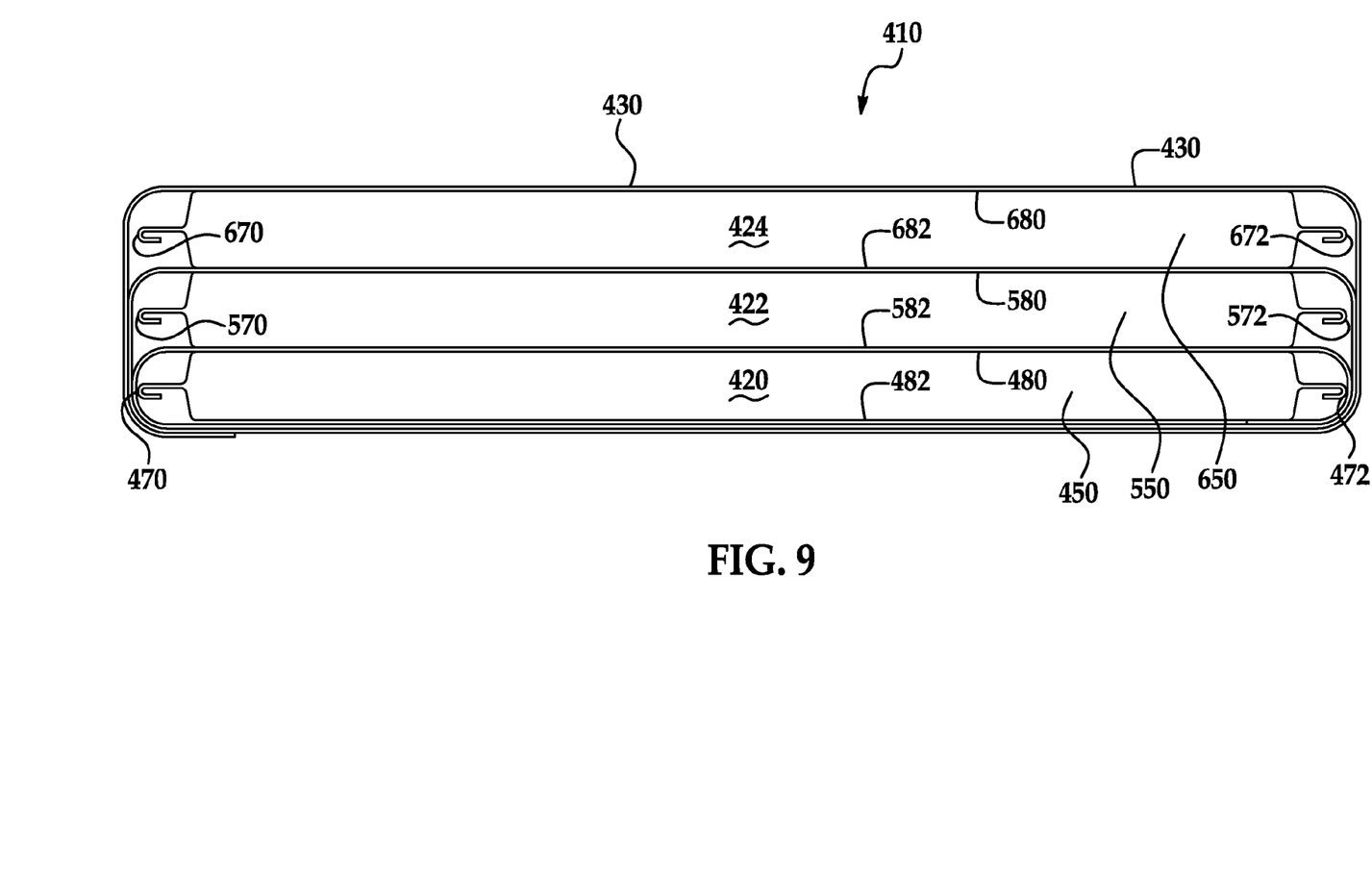
FIG. 9 is a cross-sectional schematic of the battery cell assembly of FIG. 7 taken along lines 9-9 in FIG. 7.

The battery cell 420 has a rectangular-shaped external housing 450, a first electrical terminal 452, and a second electrical terminal 454. The rectangular-shaped external housing 450 has a first end 470, a second end 472, a third end 474, and a fourth end 476. The first and second ends 470, 472 extend substantially parallel to one another. Further, the third and fourth ends 474, 476 extend substantially parallel to one another, and perpendicular to the first and second ends 470, 472. The rectangular-shaped external housing 450 further includes a top surface 480 and a bottom surface 482. The first electrical terminal 452 and the second electrical terminal 454 extend outwardly from the third and fourth ends 474, 476, respectively, of the rectangular-shaped external housing 450. In an exemplary embodiment, the battery cell 420 is a lithium-ion pouch-type battery cell.

The battery cell 422 has a rectangular-shaped external housing 550, a first electrical terminal 552, and a second electrical terminal 554. The rectangular-shaped external housing 550 has a first end 570, a second end 572, a third end 574, and a fourth end 576. The first and second ends 570, 572 extend substantially parallel to one another. Further, the third and fourth ends 574, 576 extend substantially parallel to one another, and perpendicular to the first and second ends 570, 572. The rectangular-shaped external housing 550 further includes a top surface 580 and a bottom surface 582. The first electrical terminal 552 and the second electrical terminal 554 extend outwardly from the third and fourth ends 574, 576, respectively, of the rectangular-shaped external housing 150. In an exemplary embodiment, the battery cell 422 is a lithium-ion pouch-type battery cell.

The battery cell 424 has a rectangular-shaped external housing 650, a first electrical terminal 652, and a second electrical terminal 654. The rectangular-shaped external housing 650 has a first end 670, a second end 672, a third end 674, and a fourth end 676. The first and second ends 670, 672 extend substantially parallel to one another. Further, the third and fourth ends 674, 676 extend substantially parallel to one another, and perpendicular to the first and second ends 670, 672. The rectangular-shaped external housing 650 further includes a top surface 680 and a bottom surface 682. The first electrical terminal 652 and the second electrical terminal 654 extend outwardly from the third and fourth ends 674, 676, respectively, of the rectangular-shaped external housing 250. In an exemplary embodiment, the battery cell 424 is a lithium-ion pouch-type battery cell.

The unitary wrapping sheet 430 is a flexible sheet that is disposed over the battery cells 420, 422, 424 to hold the battery cells 420, 422, 424 in a fixed position relative to one another. For example, the top surfaces 480, 580, 682 of the battery cells 420, 422, 424, respectively, are held substantially parallel to one another utilizing the unitary wrapping sheet 430. Further, the first ends 470, 470, 470 of the battery cells 420, 422, 424, respectively, are held substantially co-planar with one another utilizing the unitary wrapping sheet 430. Further, the second ends 472, 572, 672 of the battery cells 420, 422, 424, respectively, are held substantially co-planar with one another utilizing the unitary wrapping sheet 430. The unitary wrapping sheet 430 communicates with air, and does not contact an electrolyte. In an exemplary embodiment, the unitary wrapping sheet 430 is a polymeric sheet comprising at least one of a polymeric film, a polymeric mesh, and a polymeric fabric. In an alternative embodiment, the unitary wrapping sheet 430 is a natural fiber sheet comprising at least one of a natural fiber film, a natural fiber mesh, and a natural fiber fabric. In another alternative embodiment, the unitary wrapping sheet 430 is at least one of a woven carbon fiber sheet and a polyester fiber sheet. In still another alternative embodiment, the unitary wrapping sheet 430 is a flexible metallic sheet.

The unitary wrapping sheet 430 is disposed on the rectangular-shaped external housing 450 of the battery cell 420 and directly contacts the top surface 480 and the bottom surface 482 of the first battery cell 420. Further, the unitary wrapping sheet 430 is disposed on the rectangular-shaped external housing 550 of the battery cell 422 such that the unitary wrapping sheet 430 directly contacts the top surface 580 and the bottom surface 582 of the battery cell 422. Also, the unitary wrapping sheet 430 is disposed on the battery cell 424 such that the unitary wrapping sheet 430 directly contacts the top surface 680 and the bottom surface 682 of the battery cell 424. Still further, the unitary wrapping sheet 430 is disposed on and encloses a portion of a combined periphery of the battery cells 420, 422, 424 such that the top surface 480 of the battery cell 420, the top surface 580 of the battery cell 422, and the top surface 680 of the battery cell 424 are held substantially parallel to one another. In an exemplary embodiment, the unitary wrapping sheet 430 is a substantially rectangular-shaped sheet.

Figure 10:
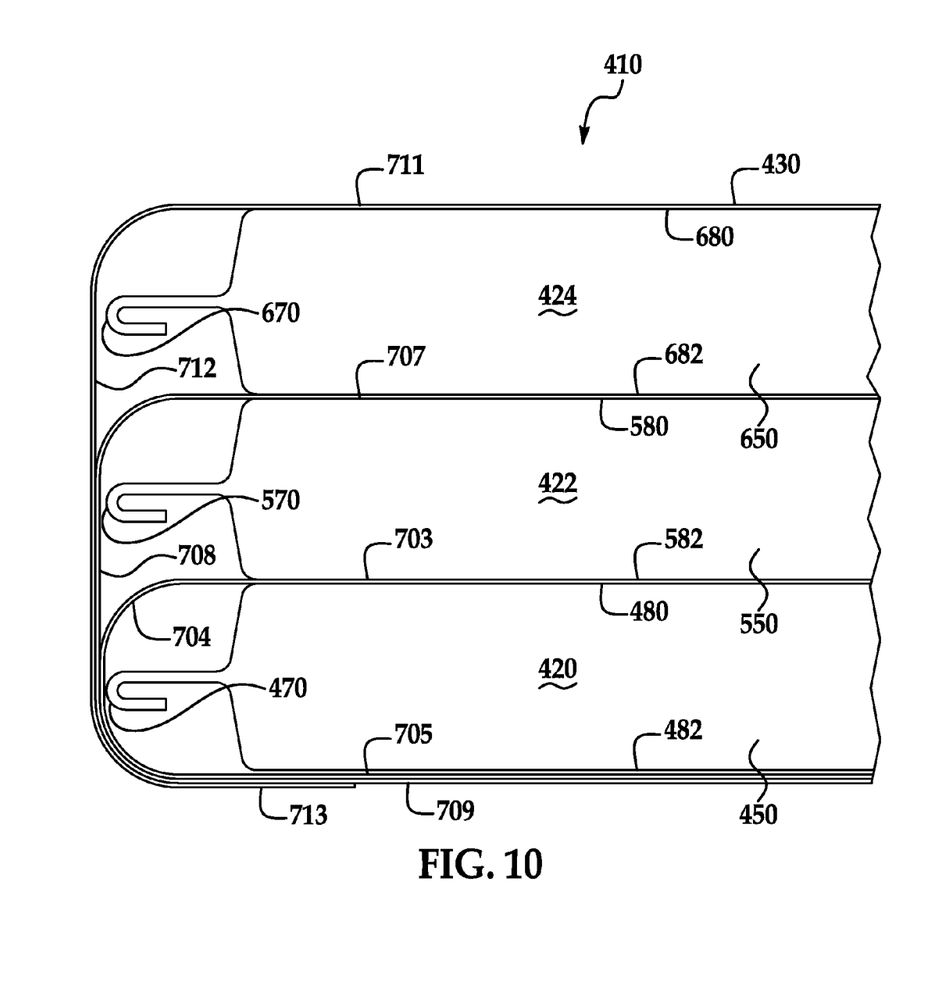
FIG. 10 is an enlarged schematic of a sheet portion of the battery cell assembly of FIG. 9.
Figure 11:
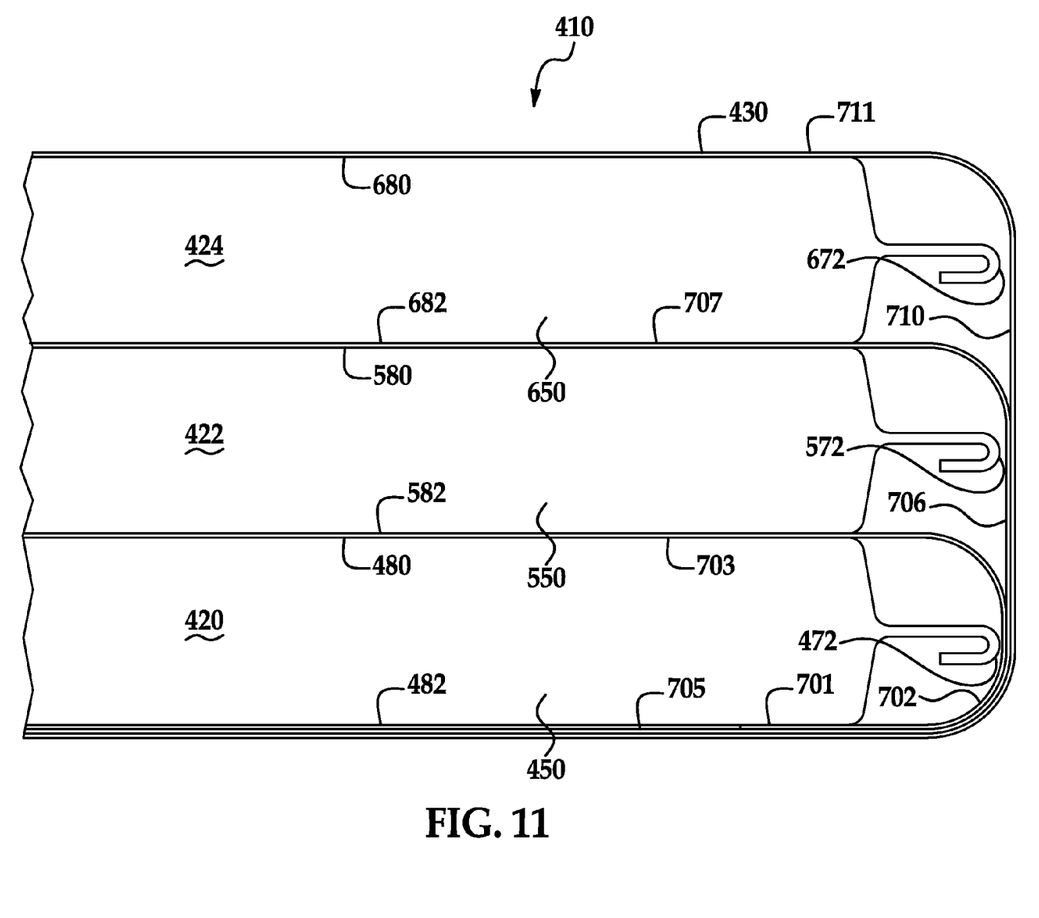
FIG. 11 is an enlarged schematic of another sheet portion of the battery cell assembly of FIG. 9.

Referring to FIGS. 10 and 11, the unitary wrapping sheet 430 includes a first sheet portion 701, a second sheet portion 702, a third sheet portion 703, a fourth sheet portion 704, a fifth sheet portion 705, a sixth sheet portion 706, a seventh sheet portion 707, an eighth sheet portion 708, a ninth sheet portion 709, a tenth sheet portion 710, an eleventh sheet portion 711, a twelfth sheet portion 712, and a thirteenth sheet portion 713. The second sheet portion 702 is coupled to and disposed between the first sheet portion 701 and the third sheet portion 703. The fourth sheet portion 704 is coupled to and disposed between the third sheet portion 703 and the fifth sheet portion 705. The sixth sheet portion 706 is coupled to and disposed between the fifth sheet portion 705 and the seventh sheet portion 707. The eighth sheet portion 708 is coupled to and disposed between the seventh sheet portion 707 and the ninth sheet portion 709. The tenth sheet portion 710 is coupled to and disposed between the ninth sheet portion 709 and the eleventh sheet portion 711. The twelfth sheet portion 712 is coupled to and disposed between the eleventh sheet portion 711 and the thirteenth sheet portion 713.

The placement of the unitary wrapping sheet 430 on the battery cells 420, 422, 424 will now be described.

The first sheet portion 701 is disposed on and directly contacts the bottom surface 482 of the battery cell 420.

The second sheet portion 702 extends from the first sheet portion 701. The second sheet portion 702 is disposed proximate to and encloses the second end 472 of the battery cell 420.

The third sheet portion 703 extends from the second sheet portion 702. The third sheet portion 703 is disposed on and directly contacts the top surface 480 of the battery cell 420.

The fourth sheet portion 704 extends from the third sheet portion 703. The fourth sheet portion 704 is disposed proximate to and encloses the first end 470 of the battery cell 420.

The fifth sheet portion 705 extends from the fourth sheet portion 704. The fifth sheet portion 705 is disposed on and directly contacts both the bottom surface 482 of the battery cell 420 and the first sheet portion 701.

The sixth sheet portion 706 extends from the fifth sheet portion 705. The sixth sheet portion 706 is disposed against the second sheet portion 702 such that the second sheet portion 702 is disposed between the sixth sheet portion 706 and the second end 472 of the battery cell 420. The sixth sheet portion 706 is further disposed proximate to and encloses the second end 572 of the battery cell 422.

The seventh sheet portion 707 extends from the sixth sheet portion 706. The seventh sheet portion 707 is disposed on and directly contacts both the top surface 580 of the battery cell 422 and the bottom surface 682 of the battery cell 424.

The eighth sheet portion 708 extends from the seventh sheet portion 707. The eighth sheet portion 708 is further disposed proximate to and encloses the first end 570 of the battery cell 422. The eighth sheet portion 708 is further disposed against the fourth sheet portion 704 such that the fourth sheet portion 704 is disposed between the eighth sheet portion 708 and the first end 470 of the battery cell 420.

The ninth sheet portion 709 extends from the eighth sheet portion 708. The ninth sheet portion 709 is disposed on and directly contacts the fifth sheet portion 705 such that the fifth sheet portion 705 is disposed between the ninth sheet portion 709 and the bottom surface 482 of the battery cell 420.

The tenth sheet portion 710 extends from the ninth sheet portion 709. The tenth sheet portion 710 is disposed on and directly contacts the sixth sheet portion 706 such that the sixth sheet portion 706 is disposed between the tenth sheet portion 710 and the second sheet portion 702. The tenth sheet portion 710 is further disposed proximate to and encloses the second end 672 of the battery cell 424.

The eleventh sheet portion 711 extends from the tenth sheet portion 710. The eleventh sheet portion 711 is disposed on and directly contacts the top surface 680 of the battery cell 424.

The twelfth sheet portion 712 extends from the eleventh sheet portion 711. The twelfth sheet portion 712 is disposed proximate to and encloses the first end 670 of the battery cell 424. The twelfth sheet portion 712 is further disposed on and directly contacts the eighth sheet portion 708 such that the eighth sheet portion 708 is disposed between the twelfth sheet portion 712 and the first end 570 of the battery cell 422.

The thirteenth sheet portion 713 extends from the twelfth sheet portion 712. The thirteenth sheet portion 713 is further disposed on and directly contacts the ninth sheet portion 709 such that the ninth sheet portion 709 is disposed between the thirteenth sheet portion 713 and the fifth sheet portion 705. The thirteenth sheet portion 713 is adhered to the ninth sheet portion 709 utilizing at least one of an ultrasonic weld joint, an adhesive, or another attachment device.

The battery cell assemblies described herein provides a substantial advantage over other battery cell assemblies. In particular, an advantage of the battery cell assemblies is that each assembly utilizes a unitary wrapping sheet to hold the battery cells in a substantially parallel orientation with respect one another without having to utilize intermediate frame members coupled to the battery cells. As a result, the battery cell assemblies described herein are lighter in weight and can be more easily assembled as compared to other battery cell assemblies.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery cell assembly, comprising:
a first battery cell having a first pouch-type external housing with a top surface and a bottom surface;
a second battery cell having a second pouch-type external housing with a top surface and a bottom surface;
a third battery cell having a third pouch-type external housing with a top surface and a bottom surface;
a unitary wrapping sheet being disposed on the first battery cell and directly contacting the top surface and the bottom surface of the first pouch-type external housing of the first battery cell;
the unitary wrapping sheet being further disposed on the second battery cell such that the unitary wrapping sheet directly contacts the top surface and the bottom surface of the second pouch-type external housing of the second battery cell;
the unitary wrapping sheet being further disposed on the third battery cell such that the unitary wrapping sheet directly contacts the top surface and the bottom surface of the third pouch-type external housing of the third battery cell; and
the unitary wrapping sheet being further disposed on and enclosing a portion of a combined periphery of the first, second, and third battery cells such that the top surface of the first pouch-type external housing of the first battery cell, the top surface of the second pouch-type external housing of the second battery cell, and the top surface of the third pouch-type external housing of the third battery cell are held substantially parallel to one another.

2. The battery cell assembly of claim 1, wherein:
the first pouch-type external housing of the first battery cell further includes a first end and a second end;
the second pouch-type external housing of the second battery cell further includes a first end and a second end;
the third pouch-type external housing of the third battery cell further includes a first end and a second end;
the first end of the first pouch-type external housing of the first battery cell, the first end of the second pouch-type external housing of the second battery, and the first end of the third pouch-type external housing of the third battery cell being substantially co-planar with one another; and
the second end of the first pouch-type external housing of the first battery cell, the second end of the second pouch-type external housing of the second battery, and the second end of the third pouch-type external housing of the third battery cell being substantially co-planar with one another.

3. The battery cell assembly of claim 2, wherein the portion of the combined periphery of the first, second, and third battery cells includes the first and second ends of the first pouch-type external housing of the first battery cell, the first and second ends of the second pouch-type external housing of the second battery cell, and the first and second ends of the third pouch-type external housing of the third battery cell.

4. The battery cell assembly of claim 2, wherein:
a first sheet portion of the unitary wrapping sheet being disposed on and directly contacting the top surface of the first pouch-type external housing of the first battery cell;
a second sheet portion of the unitary wrapping sheet extending from the first sheet portion, the second sheet portion being disposed proximate to and enclosing the first end of the first pouch-type external housing of the first battery cell;
a third sheet portion of the unitary wrapping sheet extending from the second sheet portion, the third sheet portion being disposed on and directly contacting the bottom surface of the first pouch-type external housing of the first battery cell;
a fourth sheet portion of the unitary wrapping sheet extending from the third sheet portion, the fourth sheet portion being disposed proximate to and enclosing the second end of the first pouch-type external housing of the first battery cell;
a fifth sheet portion of the unitary wrapping sheet extending from the fourth sheet portion, the fifth sheet portion being disposed on and directly contacting both the top surface of the first pouch-type external housing of the first battery cell and the bottom surface of the second pouch-type external housing of the second battery cell;
a sixth sheet portion of the unitary wrapping sheet extending from the fifth sheet portion, the sixth sheet portion being disposed proximate to and enclosing the first end of the second pouch-type external housing of the second battery cell;
a seventh sheet portion of the unitary wrapping sheet extending from the sixth sheet portion, the seventh sheet portion being disposed on and directly contacting both the top surface of the second pouch-type external housing of the second battery cell and the bottom surface of the third pouch-type external housing of the third battery cell;
an eighth sheet portion of the unitary wrapping sheet extending from the seventh sheet portion, the eighth sheet portion being disposed proximate to and enclosing the second end of the third pouch-type external housing of the third battery cell; and
a ninth sheet portion of the unitary wrapping sheet extending from the eighth sheet portion, the ninth sheet portion being disposed on and directly contacting the top surface of the third pouch-type external housing of the third battery cell.

5. The battery cell assembly of claim 4, wherein:
a tenth sheet portion of the unitary wrapping sheet extending from the ninth sheet portion, the tenth sheet portion being disposed proximate to and enclosing the first end of the third pouch-type external housing of the third battery cell, the tenth sheet portion further being disposed against the sixth sheet portion and the second sheet portion;
an eleventh sheet portion of the unitary wrapping sheet extending from the tenth sheet portion, the eleventh sheet portion being disposed on and directly contacting the third sheet portion such that the third sheet portion is disposed between the eleventh sheet portion and the bottom surface of the first pouch-type external housing of the first battery cell;
a twelfth sheet portion of the unitary wrapping sheet extending from the eleventh sheet portion, the twelfth sheet portion being disposed against the fourth sheet portion, the twelfth sheet portion being further disposed proximate to and enclosing the second end of the second pouch-type external housing of the second battery cell, the twelfth sheet portion being further disposed against the eighth sheet portion; and
a thirteenth sheet portion of the unitary wrapping sheet extending from the twelfth sheet portion, the thirteenth sheet portion being disposed on and directly contacting the ninth sheet portion such that the ninth sheet portion is disposed between the thirteenth sheet portion and the top surface of the third pouch-type external housing of the third battery cell.

6. The battery cell assembly of claim 2, wherein:
a first sheet portion of the unitary wrapping sheet being disposed on and directly contacting the bottom surface of the first pouch-type external housing of the first battery cell;
a second sheet portion of the unitary wrapping sheet extending from the first sheet portion, the second sheet portion being disposed proximate to and enclosing the second end of the first pouch-type external housing of the first battery cell;
a third sheet portion of the unitary wrapping sheet extending from the second sheet portion, the third sheet portion being disposed on and directly contacting the top surface of the first pouch-type external housing of the first battery cell;
a fourth sheet portion of the unitary wrapping sheet extending from the third sheet portion, the fourth sheet portion being disposed proximate to and enclosing the first end of the first pouch-type external housing of the first battery cell;
a fifth sheet portion of the unitary wrapping sheet extending from the fourth sheet portion, the fifth sheet portion being disposed on and directly contacting both the bottom surface of the first pouch-type external housing of the first battery cell and the first sheet portion;
a sixth sheet portion of the unitary wrapping sheet extending from the fifth sheet portion, the sixth sheet portion being disposed against the second sheet portion such that the second sheet portion is disposed between the sixth sheet portion and the second end of the first pouch-type external housing of the first battery cell, the sixth sheet portion being further disposed proximate to and enclosing the second end of the second pouch-type external housing of the second battery cell;
a seventh sheet portion of the unitary wrapping sheet extending from the sixth sheet portion, the seventh sheet portion being disposed on and directly contacting both the top surface of the second pouch-type external housing of the second battery cell and the bottom surface of the third pouch-type external housing of the third battery cell;
an eighth sheet portion of the unitary wrapping sheet extending from the seventh sheet portion, the eighth sheet portion being further disposed proximate to and enclosing the first end of the second pouch-type external housing of the second battery cell, the eighth sheet portion being further disposed against the fourth sheet portion such that the fourth sheet portion is disposed between the eighth sheet portion and the first end of the first pouch-type external housing of the first battery cell;
a ninth sheet portion of the unitary wrapping sheet extending from the eighth sheet portion, the ninth sheet portion being disposed on and directly contacting the fifth sheet portion such that the fifth sheet portion is disposed between the ninth sheet portion and the bottom surface of the first pouch-type external housing of the first battery cell;

a tenth sheet portion of the unitary wrapping sheet extending from the ninth sheet portion, the tenth sheet portion being disposed on and directly contacting the sixth sheet portion such that the sixth sheet portion is disposed between the tenth sheet portion and the second sheet portion, the tenth sheet portion being further disposed proximate to and enclosing the second end of the third pouch-type external housing of the third battery cell;

an eleventh sheet portion of the unitary wrapping sheet extending from the tenth sheet portion, the eleventh sheet portion being disposed on and directly contacting the top surface of the third pouch-type external housing of the third battery cell;

a twelfth sheet portion of the unitary wrapping sheet extending from the eleventh sheet portion, the twelfth sheet portion being disposed proximate to and enclosing the first end of the third pouch-type external housing of the third battery cell, the twelfth sheet portion being further disposed on and directly contacting the eighth sheet portion such that the eighth sheet portion is disposed between the twelfth sheet portion and the first end of the second pouch-type external housing of the second battery cell; and a thirteenth sheet portion of the unitary wrapping sheet extending from the twelfth sheet portion, the thirteenth sheet portion being further disposed on and directly contacting the ninth sheet portion such that the ninth sheet portion is disposed between the thirteenth sheet portion and the fifth sheet portion.

7. The battery cell assembly of claim 1, wherein the unitary wrapping sheet is a polymeric sheet.

8. The battery cell assembly of claim 7, wherein the polymeric sheet is at least one of a polymeric film, a polymeric mesh, and a polymeric fabric.

9. The battery cell assembly of claim 1, wherein the unitary wrapping sheet is a natural fiber sheet.

10. The battery cell assembly of claim 9, wherein the natural fiber sheet is at least one of a natural fiber film, a natural fiber mesh, and a natural fiber fabric.

11. The battery cell assembly of claim 1, wherein the unitary wrapping sheet is at least one of a woven carbon fiber sheet, a polyester fiber sheet, and a metallic sheet.

12. The battery cell assembly of claim 1, wherein the first battery cell is a pouch-type lithium-ion battery cell.

13. The battery cell assembly of claim 1, wherein the first pouch-type external housing includes a polymer film and metal sheet such that the polymer sheet is laminated on the metal sheet.

14. A battery cell assembly, comprising:

a first battery cell having a first pouch external housing with a top surface and a bottom surface, the first pouch external housing includes a polymer film and metal sheet such that the polymer sheet is laminated on the metal sheet;

a second battery cell having a second pouch external housing with a top surface and a bottom surface;

a third battery cell having a third pouch external housing with a top surface and a bottom surface;

a unitary wrapping sheet being disposed on the first battery cell and directly contacting the top surface and the bottom surface of the first pouch external housing of the first battery cell;

the unitary wrapping sheet being further disposed on the second battery cell such that the unitary wrapping sheet directly contacts the top surface and the bottom surface of the second pouch external housing of the second battery cell;

the unitary wrapping sheet being further disposed on the third battery cell such that the unitary wrapping sheet directly contacts the top surface and the bottom surface of the third pouch external housing of the third battery cell; and the unitary wrapping sheet being further disposed on and enclosing a portion of a combined periphery of the first, second, and third battery cells such that the top surface of the first pouch external housing of the first battery cell, the top surface of the second pouch external housing of the second battery cell, and the top surface of the third pouch external housing of the third battery cell are held substantially parallel to one another.

* * * * *